Sept. 30, 1947.         J. J. CHAVAYDA                2,428,143
                    FLEXIBLE COUPLING FOR TUBES
                       Filed Jan. 22, 1945
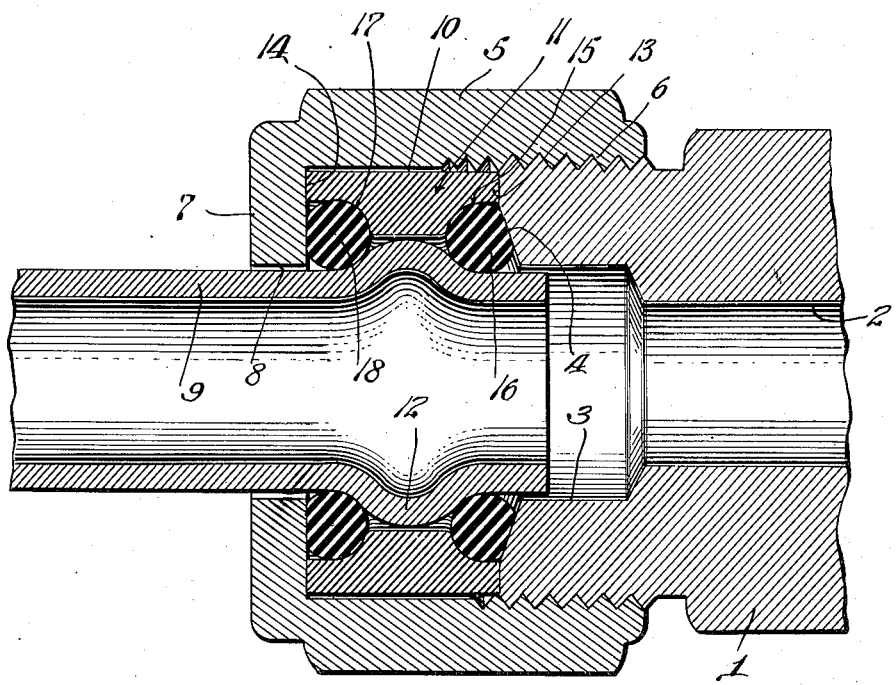
Inventor
Joseph J. Chavayda
By Mason, Porter T Diller
                    Attorneys

UNITED STATES PATENT OFFICE 2,428,143

FLEXIBLE COUPLING FOR TUBES

Joseph J. Chavayda, Cleveland, Ohio, assignor to The Parker Appliance Company, Cleveland, Ohio, a corporation of Ohio Application January 22, 1945, Serial No. 573,942

2 Claims. (Cl. 285—90)

The invention relates to new and useful improvements in a coupling for tubes and more particularly to a coupling wherein the tube is secured to the coupling by deformable gasket members so that vibrations imparted to the tube will be absorbed by the gasket members.

An object of the invention is to provide a coupling of the above type wherein the gasket members are spaced from each other so as to receive therebetween an enlargement in the tube whereby pull-out strains on the tube are resisted by one of the deformable gaskets and the sealing efficiency of the other deformable gasket is not interfered with.

In the drawings the figure is a longitudinal sectional view through a coupling embodying the improvements with the coupling in closed condition.

The coupling as illustrated includes a body member 1 having a usual bore 2 therethrough which bore is of substantially the same diameter as the inner diameter of the tube which is to be joined to the coupling. The body member is provided with a counter-bore 3 which is slightly larger in diameter than the outer diameter of the tube so that when the inner end of the tube extends into the counter-bore, it is still out of contact with the walls thereof. The end of the coupling member is cut away from the counter-bore outwardly so as to provide an inclined tapered face 4 which is to serve as the inner wall for an annular recess for a sealing gasket. The nut 5 is secured to the body member 1 by a threaded connection 6. Said nut has an inwardly extending flange 7 provided with an opening 8 therethrough for the tube which is to be attached to the coupling, and it is indicated at 9. This opening 8 in the nut is of slightly larger diameter than the outer diameter of the tube. Between the end of the body member and the flange 7 of the nut there is an annular chamber 10. In this chamber is located a sleeve 11.

The tube 9 is provided with an enlargement 12 formed by beading the tube back from the end thereof. The sleeve 11 has an inner diameter in the region of said enlargement which is slightly greater than the external diameter of the enlargement so that this sleeve 11 does not contact with the tube. The sleeve 11 at its inner end 13 abuts against the end of the body member 1 and at the outer end 14 it abuts against the flange 7 when the coupling is closed. This limits the extent to which the nut can be turned onto the body member.

The sleeve is cut away so as to provide an arcuate shaped wall 15 which forms one side of an annular recess in which is placed a deformable ring gasket 16. The tube forms the third wall of this annular recess in which the gasket 16 is located. The sleeve is also provided at its other end with an arcuate-shaped wall 17 which forms one side of an annular recess for a deformable ring gasket 18. The flange 7 at its inner face forms the other side of the annular recess containing the deformable ring gasket 18 and the outer face of the tube forms the closing side of the recess. The ring gaskets 16 and 18 are dimensioned so that when they are placed on the tube they are distorted sufficiently so as to cause the ring gaskets to make sealing contact with the tube.

In the assembly of the parts the nut is placed on the tube, then the ring gasket 18, and then the sleeve 11. After the nut and gasket 18 have been slipped onto the tube, the tube is beaded to provide the enlargement 12. The sleeve 11 is next slipped into the nut and the ring gasket 16 placed on the tube, after which the nut is turned onto the body member. This is the preferred method of assembling the parts, although this arrangement may be slightly varied, it being essential, however, that the nut be placed on the tube before the tube is beaded to provide the enlargement 12.

The arcuate surfaces in the sleeve 11 are so dimensioned and positioned that when the nut is turned onto the body member the gasket 16 will engage the inclined seat 4 and provide a sealing contact between the gasket and the body member. The gasket is also slightly expanded when placed on the tube so that the sealing gasket will have a sealing contact with the tube and with the body member. The arcuate wall 17 as shown in the drawings, is so dimensioned that when the coupling is closed the gasket is subjected to a slight pressure of the flange 7 on the nut. This pressure against the gasket will tend to deform the gasket so as to cause it to make a tight sealing contact with the tube and with the sleeve 11 and also with the flange.

Any pull-out strains on the tube due to pressure on the line or otherwise will be resisted by the gasket 18 which will be forced against the flange 7 and possibly be deformed so as to completely fill the recess in the outer end of the sleeve for the gasket. This will make a recess filled with a non-compressible fluid or deformable material which will positively resist the pulling strain on the tube. This resistance to the pull-out strains on the tube does not in any way affect or further deform the gasket 16 which remains in tight sealing contact with the body member and with the tube. These sealing gaskets are normally substantially circular in cross section and are deformed slightly when the coupling parts are assembled and the tube gripped thereby.

It will be noted that the tube is held in the coupling solely through the contact of the sealing gaskets therewith and therefore the tube may flex under vibrations and the tube will not contact with the coupling members, but the vibrations will be absorbed by these deformable ring gaskets.

The arcuate faces of the sleeve 11 are substantially the same distance from the center plane of the sleeve. The ring gaskets when placed against these arcuate surfaces, project beyond the ends of the sleeve and when the nut is tightened, the gasket 16 will be slightly deformed so as to establish a seal where it bears against the end of the body member. The gasket is also sealed against the sleeve and the tube. The same is true of the gasket 18 in its contact with the flange of the nut. The inner wall of the flange of the nut is at right angles to the longitudinal axis of the coupling while the wall 4 on the outer end of the body member is inclined. Therefore, when the coupling is closed the ring gasket 18 will be deformed to a slightly greater extent than the ring gasket 16. As already has been noted, when there is fluid pressure or other forces tending to pull the tube out of the coupling, the entire force is resisted by the ring gasket 18 without disturbing the ring gasket 16 which does the sealing. Also the ring gasket 18 is initially distorted to a greater extent than the ring gasket 16 and it will more effectively prevent outward movement of the tube. Fluid pressure on the line will also contact with the gasket 16 and deform it into tighter sealing contact with the tube, the sleeve and the body wall. Even though the tube does move outward a substantial amount before the gasket 18 is deformed sufficiently to become a positive resistance to the pull-out action, the seal of the ring gasket 16 will not be disturbed because the arcuate surface 15 does not change its position relative to the body member as the sleeve is held from movement by the nut.

The deformable gaskets are preferably made of rubber and the tube may be said to float in rubber and this ensures a long life for the tube and the coupling parts in installations where there is flexing or vibrations of the tube of substantial magnitude.

It is obvious that minor changes in the details of construction and the dimensioning of the parts may be made without departing from the spirit of the invention as set forth in the appended claims.

I claim:

1. A coupling for a tube having an enlargement adjacent the end thereof comprising a body member, a nut having a threaded connection thereto, and forming therewith an annular chamber, a sleeve in said chamber dimensioned so as to be out of contact with the tube, said sleeve having annular recesses at the inner side of each end which recesses are disposed on opposite sides of an enlargement in the tube secured to the coupling, a deformable ring gasket located in each recess, said gasket serving as the sole contact between the coupling and the tube when the coupling is closed.

2. A coupling for a tube having an enlargement adjacent the end thereof comprising a body member, a nut having a threaded connection thereto, and forming therewith an annular chamber, a metal sleeve in said annular chamber abutting against the body member and the nut when the coupling is closed, the inner diameter of said sleeve being slightly larger than the diameter of an enlargement in the tube secured to the coupling, said sleeve having annular recesses at the inner side of each end, said recesses being disposed on opposite sides of said enlargement, a deformable ring gasket located in the recess at the outer end of said sleeve and dimensioned so as to project therefrom whereby the gasket is contacted with by the flange of the nut and deformed into tight sealing contact with the sleeve and the tube when the coupling is closed, and a deformable ring gasket disposed in said inner recess and dimensioned so as to project therefrom and contact with the body member when the coupling is closed so that the gasket is deformed into tight sealing contact with the tube, the sleeve and the body member, said nut, sleeve and body member being dimensioned so that the tube is contacted with solely by said deformable gaskets.

JOSEPH J. CHAVAYDA.

REFERENCES CITED

The following references are of record in the file of this patent:

UNITED STATES PATENTS

| Number | Name | Date |
| --- | --- | --- |
| 2,318,428 | Skinner et al. | May 4, 1943 |
| 2,301,280 | Howe | Nov. 10, 1942 |